US012695393B2

(12) United States Patent
Huang et al.

(10) Patent No.: US 12,695,393 B2
(45) Date of Patent: Jul. 28, 2026

(54) SECONDARY-SIDE CONTROLLER APPLIED TO A FLYBACK POWER CONVERTER AND OPERATIONAL METHOD

(71) Applicant: Leadtrend Technology Corp., Hsinchu County (TW)

(72) Inventors: Jun-Hao Huang, Hsinchu County (TW); Tsung-Chien Wu, Hsinchu County (TW); Chung-Wei Lin, Hsinchu County (TW); Ming-Chang Tsou, Hsinchu County (TW)

(73) Assignee: Leadtrend Technology Corp., Hsinchu County (TW)

( * ) Notice: Subject to any disclaimer, the term of this patent is extended or adjusted under 35 U.S.C. 154(b) by 213 days.

(21) Appl. No.: 18/644,106

(22) Filed: Apr. 24, 2024

(65) Prior Publication Data

US 2025/0062696 A1 Feb. 20, 2025

(30) Foreign Application Priority Data

Aug. 16, 2023 (TW) ................................. 112130791

(51) Int. Cl.
H02M 3/335 (2006.01)
H02M 1/00 (2006.01)

(52) U.S. Cl.
CPC ..... H02M 3/33592 (2013.01); H02M 1/0025 (2021.05); H02M 1/0038 (2021.05)

(58) Field of Classification Search
CPC ................................................ H02M 3/33592
See application file for complete search history.

(56) References Cited

U.S. PATENT DOCUMENTS 10,756,640 B1 * 8/2020 Radic .................... H02M 3/335
2014/0133192 A1 * 5/2014 Lin ................... H02M 3/33592
                                                                363/21.14

FOREIGN PATENT DOCUMENTS

TW          201419722 A      5/2014

* cited by examiner

*Primary Examiner* — Peter M Novak
(74) *Attorney, Agent, or Firm* — Winston Hsu

(57) ABSTRACT

A secondary-side controller applied to a flyback power converter prevents a secondary side of the flyback power converter from conducting incorrectly. The secondary-side controller includes a first comparison circuit, a second comparison circuit, and a gate control signal generation circuit. The first comparison circuit generates a first comparison signal according to a drain voltage of a synchronous switch of the secondary side of the flyback power converter and a first parameter. The second comparison circuit generates a ready signal according to the first comparison signal and a resistance of an external resistor. The gate control signal generation circuit generates a gate control signal to the synchronous switch according the ready signal and the drain voltage, and the synchronous switch is turned on according to the gate control signal.

12 Claims, 3 Drawing Sheets

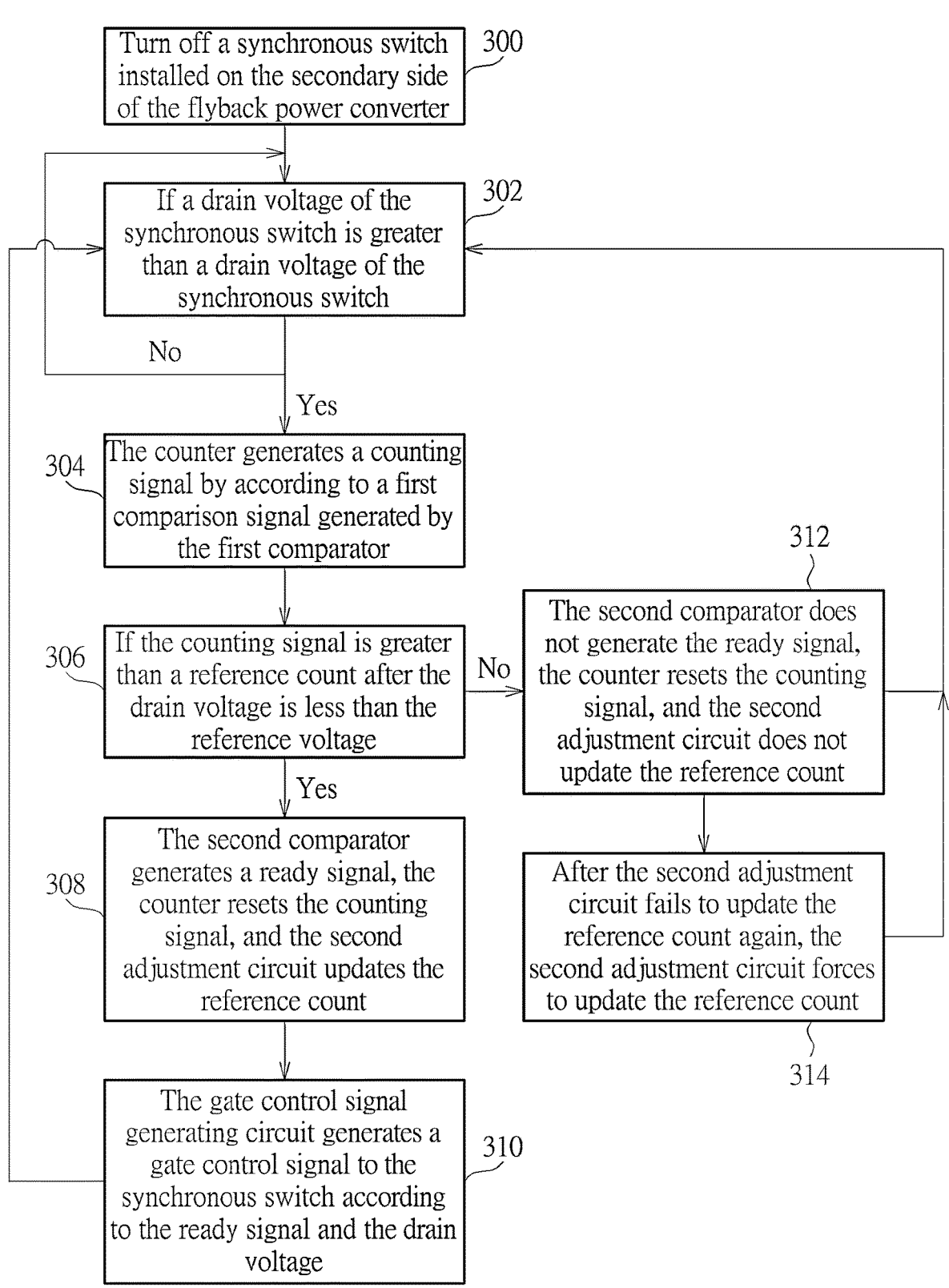

Turn off a synchronous switch installed on the secondary side of the flyback power converter  300

If a drain voltage of the synchronous switch is greater than a drain voltage of the synchronous switch  302

No

Yes

The counter generates a counting signal by according to a first comparison signal generated by the first comparator  304

If the counting signal is greater than a reference count after the drain voltage is less than the reference voltage  306

No

The second comparator does not generate the ready signal, the counter resets the counting signal, and the second adjustment circuit does not update the reference count  312

Yes

The second comparator generates a ready signal, the counter resets the counting signal, and the second adjustment circuit updates the reference count  308

After the second adjustment circuit fails to update the reference count again, the second adjustment circuit forces to update the reference count  314

The gate control signal generating circuit generates a gate control signal to the synchronous switch according to the ready signal and the drain voltage  310

FIG. 2

SECONDARY-SIDE CONTROLLER APPLIED TO A FLYBACK POWER CONVERTER AND OPERATIONAL METHOD

BACKGROUND OF THE INVENTION

1. Field of the Invention

The present invention relates to a secondary-side synchronous rectifier controller applied to a flyback power converter and an operational method thereof, and particularly to a secondary-side synchronous rectifier controller and an operational method thereof that can prevent a secondary side of the flyback power converter from being conducted incorrectly.

2. Description of the Prior Art

After a synchronous switch of a secondary side of a flyback power converter is turned off, a drain voltage of the synchronous switch will begin to resonate. If a resonance convergence speed of the drain voltage or an amplitude of the drain voltage is too large, a secondary-side controller installed on the secondary side of the flyback power converter may misjudge to make the synchronous switch turned on incorrectly. Meanwhile, if a primary side of the flyback power converter also meets conduction conditions, a Short-Through between the primary side of the flyback power converter and the secondary side of the flyback power converter will occur.

The prior art provides a fixed shielding time to make the secondary-side controller not false-turn on the synchronous switch during a resonance interval of the drain voltage so that the Short-Through fails to occur between the primary side of the flyback power converter and the secondary side of the flyback power converter. However, during the resonance interval of the drain voltage, the resonance convergence speed of the drain voltage or the amplitude of the drain voltage will be influenced by a load of the flyback power converter, so the fixed shielding time may not be able to respond to variety of the load, resulting in the synchronous switch being still possible to false-turn on. Therefore, how to improve the above-mentioned shortcomings of the prior art has become an important issue for designers of the secondary-side controller. In addition, the present invention claims priority to Taiwan Patent Application No. 112130791, filed on Aug. 16, 2023.

SUMMARY OF THE INVENTION

An embodiment of the present invention provides a secondary-side controller applied to a flyback power converter, wherein the secondary-side controller prevents a secondary side of the flyback power converter from conducting incorrectly. The secondary-side controller includes a first comparison circuit, a second comparison circuit, and a gate control signal generating circuit. The first comparison circuit is used for generating a first comparison signal according to a drain voltage of a synchronous switch of the secondary side of the flyback power converter and a first parameter. The second comparison circuit is coupled to the first comparison circuit for generating a ready signal according to the first comparison signal and a resistance of an external resistor. The gate control signal generating circuit is coupled to the second comparison circuit, wherein the gate control signal generating circuit generates a gate control signal to the synchronous switch according to the ready signal and the drain voltage, and the synchronous switch is turned on according to the gate control signal.

Another embodiment of the present invention provides an operational method of a secondary-side controller applied to a flyback power converter, wherein the secondary-side controller includes a first comparison circuit, a second comparison circuit, and a gate control signal generating circuit. The operational method includes the first comparison circuit generating a first comparison signal according to a drain voltage of a synchronous switch on a secondary side of the flyback power converter and a first parameter; the second comparison circuit generating a ready signal according to the first comparison signal and a resistance of an external resistor; and the gate control signal generating circuit generating a gate control signal to the synchronous switch according to the ready signal and the drain voltage, wherein the synchronous switch is turned on according to the gate control signal.

The present invention provides a secondary-side controller applied to a flyback power converter and an operational method thereof. The secondary-side controller and the operational method can make a length of a resonance shielding time corresponding to a drain voltage of a synchronous switch of a secondary side of a flyback power converter be adjusted with turning-on time of a power switch of a primary side of the flyback power converter in a previous cycle, so after the drain voltage begins to resonate, the synchronous switch will not be turned on due to the resonance of the drain voltage to ensure that the primary side and the secondary side of the flyback power converter will not be conducted simultaneously. Therefore, compared with the prior art, the present invention can maximize the resonance shielding time through the turning-on time of the power switch in the previous cycle, determine the resonance interval of the drain voltage more accurately, and prevent the secondary side of the flyback from being conducted incorrectly to increase the stability of the flyback power converter.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a flowchart illustrating an operational method of the secondary-side controller applied to the flyback power converter according to a second embodiment of the present invention.

DETAILED DESCRIPTION

Figure 1:
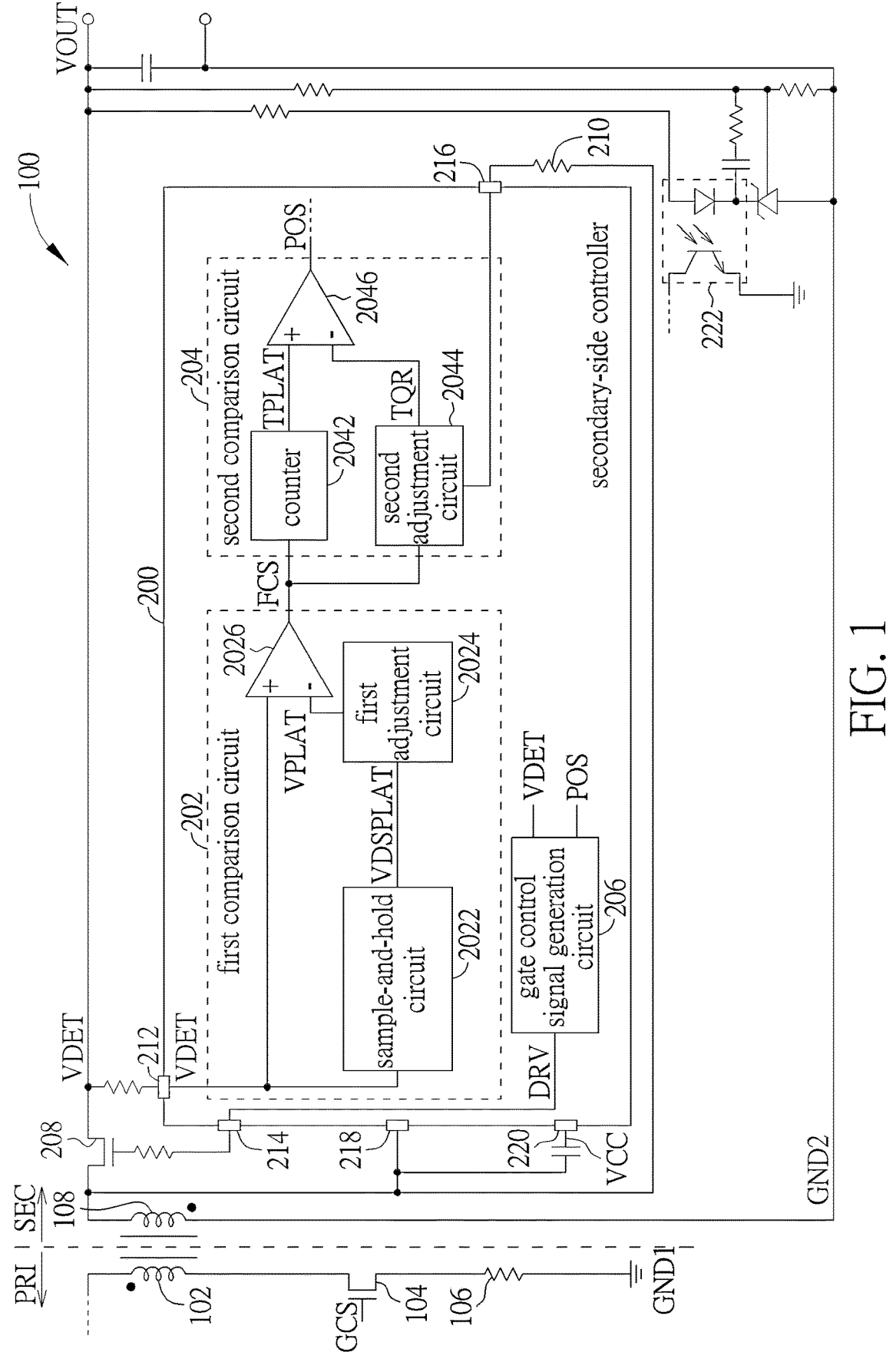
FIG. 1 is a diagram illustrating a secondary-side controller applied to a flyback power converter according to a first embodiment of the present invention.

Please refer to FIG. 1. FIG. 1 is a diagram illustrating a secondary-side controller 200 applied to a flyback power converter 100 according to a first embodiment of the present invention, where the secondary-side controller 200 is used for preventing a secondary side SEC of the flyback power converter 100 from being conducted incorrectly, and the flyback power converter 100 operates in a quasi-resonance mode. In addition, since the present invention relates to the secondary-side controller 200 installed on the secondary side SEC of the flyback type power converter 100, rather than relating to a primary-side controller installed on a primary side PRI of the flyback type power converter 100, for simplifying FIG. 1, the primary side PRI of the flyback power converter 100 only shows a primary winding 102, a power switch 104, and a resistor 106. As shown in FIG. 1, the secondary-side controller 200 at least includes a first comparison circuit 202, a second comparison circuit 204, and a gate control signal generation circuit 206. The first comparison circuit 202 includes a sample-and-hold circuit 2022, a first adjustment circuit 2024, and a first comparator 2026, and the second comparison circuit 204 includes a counter 2042, a second adjustment circuit 2044, and a second comparator 2046. In addition, the coupling relationships between the primary winding 102, the power switch 104, and the resistor 106, and the coupling relationships between the first comparison circuit 202, the second comparison circuit 204, the gate control signal generation circuit 206, the sample-and-hold circuit 2022, the first adjustment circuit 2024, the first comparator 2026, the counter 2042, the second adjustment circuit 2044, and the second comparator 2046 can be referred to FIG. 1, so further description thereof is omitted for simplicity. In addition, ground potential GND1 of the primary side PRI of the flyback type power converter 100 is different from ground potential GND2 of the secondary side SEC of the flyback type power converter 100.

Figure 3:
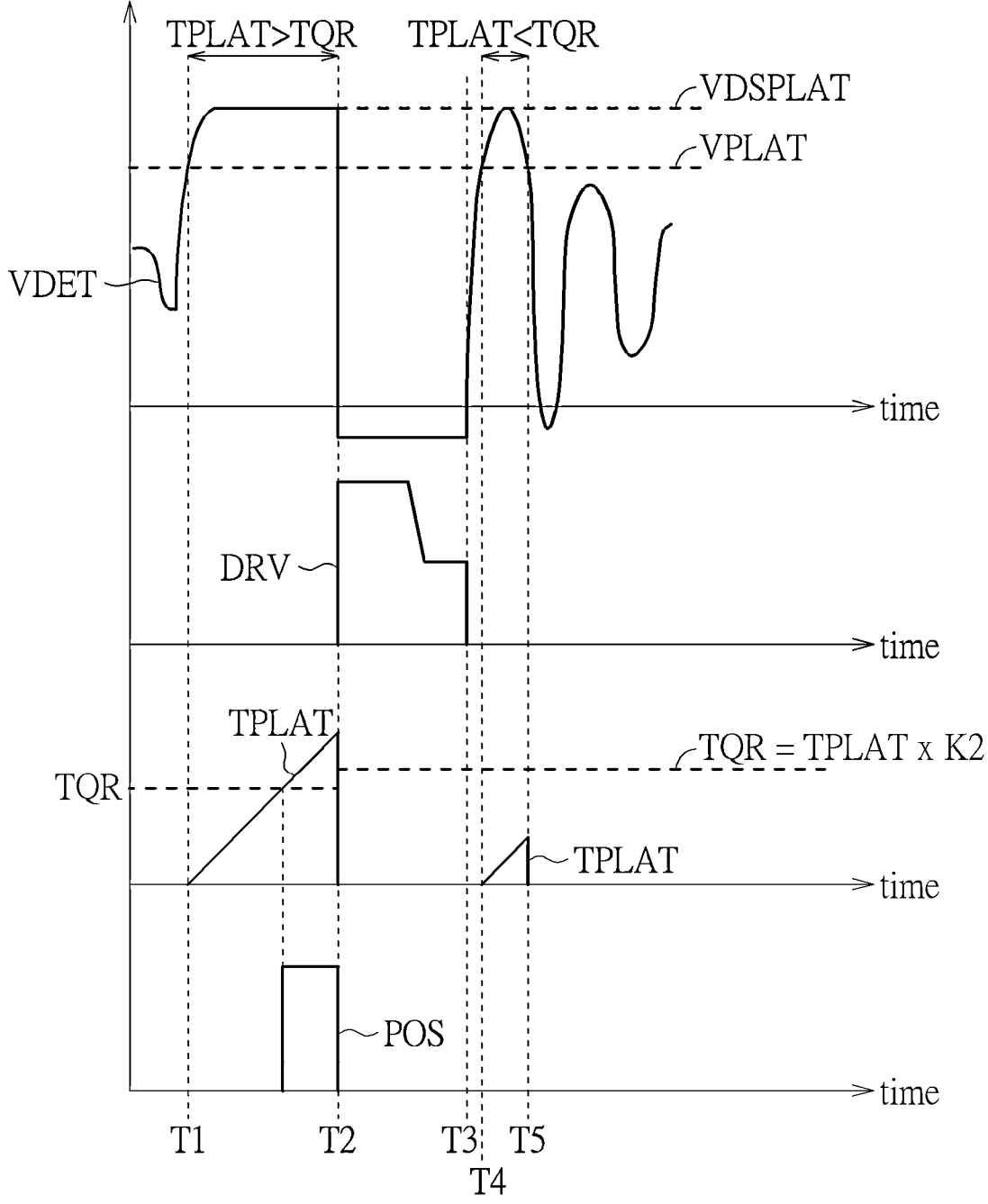
FIG. 3 is a diagram illustrating the drain voltage of the synchronous switch, the reference voltage, the counting signal, the reference count, the ready signal, the gate control signal of the synchronous switch, and the sampling voltage.

In addition, please refer to FIG. 1, FIG. 2, and FIG. 3. FIG. 2 is a flowchart illustrating an operational method of the secondary-side controller 200 applied to the flyback power converter 100 according to a second embodiment of the present invention. The operational method in FIG. 2 is illustrated by using the flyback power converter 100 and the secondary-side controller 200 in FIG. 1. Detailed steps are as follows:

Step 300: Turn off a synchronous switch 208 installed on the secondary side SEC of the flyback power converter 100.

Step 302: If a drain voltage VDET of the synchronous switch 208 is greater than a drain voltage VDET of the synchronous switch VPLAT; if yes, go to Step 304; if no, go to Step 302 again.

Step 304: The counter 2042 generates a counting signal TPLAT by according to a first comparison signal FCS generated by the first comparator 2026.

Step 306: If the counting signal TPLAT is greater than a reference count TOR after the drain voltage VDET is less than the reference voltage VPLAT; if yes, go to Step 308; if no, go to Step 312.

Step 308: The second comparator 2046 generates a ready signal POS, the counter 2042 resets the counting signal TPLAT, and the second adjustment circuit 2044 updates the reference count TOR.

Step 310: The gate control signal generating circuit 206 generates a gate control signal DRV to the synchronous switch 208 according to the ready signal POS and the drain voltage VDET, go to Step 300.

Step 312: The second comparator 2046 does not generate the ready signal POS, the counter 2042 resets the counting signal TPLAT, and the second adjustment circuit 2044 does not update the reference count TOR, go to Step 300.

Step 314: After the second adjustment circuit 2044 fails to update the reference count TOR again, the second adjustment circuit 2044 forces to update the reference count TOR, go to Step 300.

In Step 300, please refer to FIG. 1 and FIG. 3 at the same time. As a time T1 shown in FIG. 3, because a gate control signal GCS which controls turning-on of the power switch 104 of the primary side PRI of the flyback power converter 100 is enabled, the power switch 104 is turned on, wherein the drain voltage VDET is changed with the gate control signal GCS due to the coupling effect between the primary winding 102 and a secondary winding 108.

In Step 302, please refer to FIG. 1 and FIG. 3 at the same time. Before the time T1, if the counting signal TPLAT generated by the counter 2042 is greater than the reference count TOR generated by the second adjustment circuit 2044, then the second adjustment circuit 2044 can update the reference count TOR through a resistance of an external resistor 210 outside the secondary-side controller 200 according to turning-on time (corresponding to the counting signal TPLAT before the time T1) of the power switch 104 before the time T1, wherein the reference count TQR is equal to the count signal TPLAT*K2, K2 is controlled by the resistance of the external resistor 210, and the second adjustment circuit 2044 is coupled to the external resistor 210 through a pin 216 of the secondary-side controller 200. That is to say, the reference count TOR relates to the turning-on time of the power switch 104 in the previous cycle. In addition, before the time T1, if the count signal TPLAT generated by the counter 2042 is greater than the reference count TOR generated by the second adjustment circuit 2044, the first adjustment circuit 2024 can update the reference voltage VPLAT according to a current sampling voltage VDSPLAT generated by the sample-and-hold circuit 2022 and a first parameter K1, wherein the first parameter K1 is generated from an inner of the secondary-side controller 200, and the sampling and holding circuit 2022 receives the drain voltage VDET through a pin 212 of the secondary-side controller 200.

Therefore, please refer to FIG. 1 and FIG. 3 at the same time. In Step 304, at the time T1, the first comparator 2026 compares the current drain voltage VDET with the reference voltage VPLAT generated before the time T1, and when the current drain voltage VDET is greater than the reference voltage VPLAT generated before the time T1, the first comparator 2026 generates the first comparison signal FCS, wherein the first comparator 2026 receives the drain voltage VDET through the pin 212 of the secondary-side controller 200, and the counter 2042 can begin to generate the counting signal TPLAT according to the first comparison signal FCS.

Please refer to FIG. 1 and FIG. 3 at the same time. In Step 308, at a time T2, because the current count signal TPLAT is greater than the reference count TOR (meanwhile, the reference count TOR relates to the turning-on time of the power switch 104 in the previous cycle (before the time T1)), the second comparator 2046 generates the ready signal POS, the counter 2042 resets the counting signal TPLAT, and the second adjustment circuit 2044 updates the reference count TOR (meanwhile, the reference count TOR relates to the turning-on time of the power switch 104 between the time T1 and the time T2).

Please refer to FIG. 1 and FIG. 3 at the same time. In Step 310, at the time T2, after the gate control signal generating circuit 206 receives the ready signal POS and when the drain voltage VDET is less than a judgment voltage (for example, −0.1V), the gate control signal generating circuit 206 generates the gate control signal DRV to the synchronous switch 208, wherein the gate control signal generating circuit 206 receives the drain voltage VDET through the pin 212 of the secondary-side controller 200 and transmits the gate control signal DRV to the synchronous switch 208 through a pin 214 of the secondary-side controller 200, and the synchronous switch 208 can be turned on according to the gate control signal DRV.

In addition, in Step 300, as shown in FIG. 3, at a time T3, the synchronous switch 208 is turned off, wherein after the synchronous switch 208 is turned off, the drain voltage VDET will begin to resonate. In Step 304, as shown in FIG. 3, at a time T4, the first comparator 2026 compares the current drain voltage VDET with the reference voltage VPLAT generated before the time T3, and when the current drain voltage VDET is greater than the reference voltage VPLAT generated before the time T3, the first comparator 2026 generates the first comparison signal FCS, wherein the first comparator 2026 receives the drain voltage VDET through the pin 212 of the secondary-side controller 200, and the counter 2042 can generate the counting signal TPLAT according to the first comparison signal FCS.

In Step 312, at a time T5, because the current count signal TPLAT is less than the reference count TOR (meanwhile, the reference count TOR relates to the turning-on time of the power switch 104 between the time T1 and the time T2), the second comparator 2046 does not generate the ready signal POS, the counter 2042 resets the count signal TPLAT, and the second adjustment circuit 2044 does not update the reference count TOR. Because the second comparator 2046 does not generate the ready signal POS, the gate control signal generating circuit 206 does not generate the gate control signal DRV to the synchronous switch 208. That is to say, because the reference count TOR (corresponding to a length of the resonance shielding time of the drain voltage VDET) can be adjusted with the turning-on time of the power switch 104 in the previous cycle, after the drain voltage VDET begins to resonate, the synchronous switch 208 will not be turned on due to the resonance of the drain voltage VDET to ensure that the primary side PRI of the flyback power converter 100 and the secondary side SEC of the flyback power converter 100 are not simultaneously conducted.

In Step 314, if a load (not shown in FIG. 1) of the secondary side SEC of the flyback power converter 100 is light or a voltage of the load is changed dramatically suddenly to make the second adjustment circuit 2044 not update the reference count TOR again, Step 302 is executed again. In addition, in another embodiment of the present invention, when the second adjustment circuit 2044 does not update the reference count TOR for more than two consecutive times (such as three times, four times, five times, etc.), Step 302 is executed again. That is to say, when the load is light or the voltage of the load is changed dramatically suddenly, Step 314 can ensure that the flyback power converter 100 operates normally.

In addition, please refer to FIG. 1 again. The secondary-side controller 200 can receive the ground potential GND2 and a supply voltage VCC through a pin 218 and a pin 220, respectively. In addition, in an embodiment of the present invention, the primary-side controller (not shown in FIG. 1) can detect a state of an output voltage VOUT of the secondary side SEC of the flyback power converter 100 through an photo-coupler 222, and determines whether to generate the gate control signal GCS to the power switch 104 according to the state of the output voltage VOUT to make the primary side PRI of the flyback power converter 100 conduct.

In summary, because the secondary-side controller and the operational method thereof can make the reference count (corresponding to the length of resonance shielding time of the drain voltage) be adjusted with the turning-on time of the power switch in the previous cycle, after the drain voltage begins to resonate, the synchronous switch will not be turned on due to the resonance of the drain voltage to ensure that the primary side and the secondary side of the flyback power converter will not be conducted simultaneously. Therefore, compared with the prior art, the present invention can maximize the resonance shielding time through the turning-on time of the power switch in the previous cycle, determine the resonance interval of the drain voltage more accurately, and prevent the secondary side of the flyback from being conducted incorrectly to increase the stability of the flyback power converter.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A secondary-side controller applied to a flyback power converter, wherein the secondary-side controller prevents a secondary side of the flyback power converter from conducting incorrectly, the secondary-side controller comprising:

a first comparison circuit for generating a first comparison signal according to a drain voltage of a synchronous switch of the secondary side of the flyback power converter and a first parameter, wherein the first comparison circuit comprises:

a sample-and-hold circuit for generating a sampled voltage according to the drain voltage;

a first adjustment circuit coupled to the sample-and-hold circuit, wherein the first adjustment circuit updates a reference voltage according to the sampled voltage and the first parameter, and the first parameter is generated from an internal circuit element of the secondary-side controller; and a first comparator coupled to the synchronous switch and the first adjustment circuit, wherein the first comparator generates the first comparison signal when the drain voltage is greater than the reference voltage;

a second comparison circuit coupled to the first comparison circuit for generating a ready signal according to the first comparison signal and a resistance of an external resistor; and a gate control signal generating circuit coupled to the second comparison circuit, wherein the gate control signal generating circuit generates a gate control signal to the synchronous switch according to the ready signal and the drain voltage, and the synchronous switch is turned on according to the gate control signal.

2. A secondary-side controller applied to a flyback power converter, wherein the secondary-side controller prevents a secondary side of the flyback power converter from conducting incorrectly, the secondary-side controller comprising:

a first comparison circuit for generating a first comparison signal according to a drain voltage of a synchronous switch of the secondary side of the flyback power converter and a first parameter;

a second comparison circuit coupled to the first comparison circuit for generating a ready signal according to the first comparison signal and a resistance of an external resistor, wherein the second comparison circuit comprises:

a counter coupled to the first comparison circuit, wherein the counter generates a counting signal according to the first comparison signal;

a second adjustment circuit coupled to the first comparison circuit and the external resistor, wherein the second adjustment circuit updates a reference count according to the first comparison signal and the resistance of the external resistor; and a second comparator coupled to the counter and the second adjustment circuit, wherein the second comparator generates the ready signal when the count signal is greater than the reference count and after the drain voltage is less than a reference voltage, and the counter resets the count signal when the count signal is greater than the reference count and after the drain voltage is less than the reference voltage; and a gate control signal generating circuit coupled to the second comparison circuit, wherein the gate control signal generating circuit generates a gate control signal to the synchronous switch according to the ready signal and the drain voltage, and the synchronous switch is turned on according to the gate control signal.

3. The secondary-side controller of claim 2, wherein when the count signal is less than the reference count and after the drain voltage is less than the reference voltage, the counter resets the count signal and the second adjustment circuit does not update the reference count.

4. The secondary-side controller of claim 3, wherein after the reference count is not updated for more than two consecutive times, the second adjustment circuit updates the reference count.

5. The secondary-side controller of claim 2, wherein when the gate control signal generating circuit receives the ready signal and the drain voltage is less than a judgement voltage, the gate control signal generating circuit generates the gate control signal to the synchronous switch.

6. The secondary-side controller of claim 2, wherein the flyback power converter operates in a quasi-resonance mode.

7. An operational method of a secondary-side controller applied to a flyback power converter, wherein the secondary-side controller comprises a first comparison circuit, a second comparison circuit, and a gate control signal generating circuit, the operational method comprises:

a sample-and-hold circuit of the first comparison circuit generating a sampled voltage according to a drain voltage;

a first adjustment circuit of the first comparison circuit updating a reference voltage according to the sampled voltage and a first parameter, wherein the first parameter is generated from an internal circuit element of the secondary-side controller; and a first comparator of the first comparison circuit generating a first comparison signal when the drain voltage is greater than the reference voltage;

the second comparison circuit generating a ready signal according to the first comparison signal and a resistance of an external resistor; and the gate control signal generating circuit generating a gate control signal to a synchronous switch on a secondary side of the flyback power converter according to the ready signal and the drain voltage, wherein the synchronous switch is turned on according to the gate control signal.

8. An operational method of a secondary-side controller applied to a flyback power converter, wherein the secondary-side controller comprises a first comparison circuit, a second comparison circuit, and a gate control signal generating circuit, the operational method comprises:

the first comparison circuit generating a first comparison signal according to a drain voltage of a synchronous switch on a secondary side of the flyback power converter and a first parameter;

a counter of the second comparison circuit generating a counting signal according to the first comparison signal;

a second adjustment circuit of the second comparison circuit updating a reference count according to the first comparison signal and the resistance of the external resistor;

after the drain voltage is less than a reference voltage and when the count signal is greater than the reference count, a second comparator of the second comparison circuit generating the ready signal and the counter resetting the count signal; and the gate control signal generating circuit generating a gate control signal to the synchronous switch according to the ready signal and the drain voltage, wherein the synchronous switch is turned on according to the gate control signal.

9. The operational method of claim 8, wherein after the drain voltage is less than the reference voltage and when the count signal is less than the reference count, the count signal is reset and the reference count is not updated.

10. The operation method of claim 9, wherein after the reference count is not updated for more than two consecutive times, the second adjustment circuit updates the reference count.

11. The operational method of claim 8, wherein when the gate control signal generating circuit receives the ready signal and the drain voltage is less than a judgement voltage, the gate control signal generating circuit generates the gate control signal to the synchronous switch.

12. The operational method of claim 8, wherein the flyback power converter operates in a quasi-resonant mode.

* * * * *